(12) United States Patent
Carleton et al.

(10) Patent No.: US 6,292,204 B1
(45) Date of Patent: Sep. 18, 2001

(54) METHOD AND APPARATUS FOR DISPLAY OF VIDEO IMAGES IN A VIDEO CONFERENCING SYSTEM

(75) Inventors: Allison A. Carleton, Lisle; Paul A. Peterson, Oak Park; William C. Schwartz, Downers Grove, all of IL (US)

(73) Assignee: NCR Corporation, Dayton, OH (US)

( * ) Notice: Subject to any disclaimer, the term of this patent is extended or adjusted under 35 U.S.C. 154(b) by 1391 days.

(21) Appl. No.: 08/481,230

(22) Filed: Jun. 8, 1995

Related U.S. Application Data

(63) Continuation of application No. 08/128,017, filed on Sep. 28, 1993, now abandoned.

(51) Int. Cl.[7] .................................................... G06F 13/00
(52) U.S. Cl. ............................................ 345/753; 345/755
(58) Field of Search ............................ 379/93, 202, 203, 379/204, 205, 206; 348/14, 479, 15; 345/119, 115, 753, 755, 778, 779, 781, 803–804; 395/118, 115, 153, 154, 330, 331, 332; H04N 7/15

(56) References Cited

U.S. PATENT DOCUMENTS

| | | | |
|---|---|---|---|
| 4,112,252 | * | 9/1978 | Liebler .................................. 348/479 |
| 5,195,086 | * | 3/1993 | Baumgartner et al. ............... 379/202 |
| 5,283,638 | * | 2/1994 | Engberg ................................. 348/14 |
| 5,311,577 | * | 5/1994 | Madrid ................................... 379/93 |
| 5,365,265 | * | 11/1994 | Shibata et al. ......................... 348/15 |
| 5,434,964 | * | 7/1995 | Moss et al. ........................... 395/332 |
| 5,530,795 | * | 6/1996 | Wan ....................................... 395/332 |
| 5,544,300 | * | 8/1996 | Skarbo et al. ........................ 395/332 |
| 5,546,324 | * | 8/1996 | Palmer et al. .......................... 348/15 |

FOREIGN PATENT DOCUMENTS

| | | |
|---|---|---|
| 410378A2 | 1/1991 | (EP) . |
| 0480634 | * 4/1992 | (EP) ...................................... 379/93 |
| 1-233869 | * 9/1989 | (JP) ..................................... 379/202 |

OTHER PUBLICATIONS

NEC Advertisement, Telecommunications Oct. 1985, p 58x.*

(List continued on next page.)

Primary Examiner—Chanh Nguyen
(74) Attorney, Agent, or Firm—Douglas S. Foote

(57) ABSTRACT

A method of displaying a video image in a computer which has the ability to simultaneously display multiple windows. A graphics image is displayed in a first window, and a video image is displayed in a second window having controls for annotating the graphics image in the first window.

2 Claims, 4 Drawing Sheets

OTHER PUBLICATIONS

Brad A. Myers, "Window Interfaces A Taxonomy of Window Manager User Interfaces", *I.E.E.E. Computer Graphics and Applications*, No. 5, Sep. 1988, pp. 65–84.*

Masaki et al., "A Desktop Teleconferencing Terminal Based on B–ISDN: PMTC", *NTT Review*, vol. 4, No. 4, Jul., 1992, Tokyo.

Tanigawa et al., "Personal Multimedia–Multipoint Teleconference System", *IEEE Infocom*, The Conference on Computer Communications, vol. 3, Apr. 7, 1991, pp. 1127–1144.

Robinson et al., :A Multimedia Interactive Conferencing Application for Personal Workstations, *IEEE Transactions on Communications*, vol. 39, No. 11, Nov., 1991, pp. 1698–1708.

Achhammer, et al., "Videophone and Audiovisual Workstateion with p×64 bit/s for New Applications", *PTR Philips Telecommunication Review*, vol. 49, No. 3, Sep., 1991, Hilversum, NL.

*IBM Technical Disclosure Bulletin*, vol. 34, No. 7A, Dec., 1991, Armonk, NY, pp. 380–381.

W. Leo Hoarty, "Multimedia on Cable Television Systems", 18th International Television Symposium and Technical Exhibition, Jun. 10, 1993, Montreux, Switzerland, pp. 555–567.

Andrews, Edmund L., "Plugging the Gap Between E–Mail and Video Conferencing" *New Yrok TIme*, Sunday, Jun. 23, 1991, p. 9.

Palme, Jacob, "Distributed Computer Conferencing", Elsevier Science Publishers B.V. (North–Holland), pp. 137–145.

Kelly, John N., "Technology That Supports Meetings" *Patricia Seybold's Office Computing Report*, Sep., 1988.

Preliminary Information from ShareVision Technology Inc., 1992, PPIN0992 Rev. B,.

Hoshi, Nakamura, Nakamura, "Broadband ISDN Multimedia Workstations and Group Tele–Working Systems", *Hitachi Review* vol. 40 (1991), No. 3, pp. 217–222.

Watabe, Sakata, Maeno, Fukuoka and Ohmori, "Multimedia Desktop Conferencing System: Mermaid", *NEC Research and Development* vol. 32, No. 1 pp. 158–167, Jan. 1991.

Piturro, Marlene C., "Computer Conferencing: Brainstorming Across Time and Space", *Management Review*, Aug., 1969, pp. 43–50.

"IBM Person to Person" Brochure, UltiMedia, IBM United States, Oct., 1991.

SMART 2000 Conferencing System Brochure, SMART Technologies Inc., Calgary, AB Canada.

Wynne, Bye, "Group Support Systems and Electronic Collaboration", American Management Association *Information Management Forum*, May, 1991.

Wynne, Bye, "Groupware and Your Future", American Management Association *Information Management Forum*, Nov., 1989.

"Texaco Contributes to Group Decision Support Services Project", Campus News, *MMR*, Summer, 1990, p. 23.

DeskTop Conferencing Novell® Local Area Networks Product Description, Fujitsu Networks Industry, Inc.

Street, April, "Videoconferencing On Any Wire", *MacWeek*, Oct. 5, 1993.

Bartino, Jim, "At These Shouting matches, No One Says A Word" *Business Week*, Jun. 11, 1990.

Telegraphics Design Document Draft May 22, 1992.

"Desk Top Conferencing for Windows" Brochure by Fujitsu Networks Industry, Inc., 1993.

Moskowitz, Robert, "The Electronic Meeting" *Presentation Products Magazine*, Sep., 1990, pp.24–32.

Aring & Robinson; "Support For Informal Communication in Distributed Group Work", *Wideband Communication*, pp. 864–870.

Werner B. Korte, "Multimedia BK Technology for the Support of Distributed Group Work", *Widebank Communication*, pp. 872–878.

VISIT video, Northern Telecom brochure.

Southworth, Mason,, "How to Have an 'Electronic' Brainstorm", No. 1, 1990, pp. 12 and 13.

Richman, Louis S., "Software Catches The Team Spirit", Reprinted through the courtesy of the Editors of FORTUNE.

LaPlante, Alice, "Workgroup Idea Still Unclear to Users", *Info World*, Dec. 11, 1989, vol. 11, Issue 5.

"Meeting Support An Emerging Market" pp. 69–75.

ENTENTÉ, Tuenkey Electronic Classroom.

"The Year 2000: Expect Meetings to Change, Not Decline", *The 3M Meeting Management News*, vol. 3, No. 1.

"Study Focuses On Use Of Rules in Meetings", *The 3M Meeting Management Institute*, vol. 3, No. 3, Dec., 1991.

Johansen, Robert "Teams for Tomorrow", Institute for the Future, p. 521–534.

Rodden, Tom, "A Survey of CSCW Systems", *Interacting with Computers*, vol. 3, No. 3 (1991) pp. 319–353.

LaPlant, Alice, "IBM Study: PCs Aid in Decision Process", *Info World*, vol. 11, Issue 49.

Panko, Raymond R., Presentation Patterns of Organizational Communication.

"Brainstorming by Modem", *The New York Times*, Sunday, Mar. 24, 1991.

Newbridge Networks, "Inverse Multiplexing and So Much More", pp. 1–6.

Newbridge Networks, "Product Overview", pp. 7–32.

Newbridge Networks, "3500 Main Street", pp. 33–36.

Newbridge Networks, "4600 Main Street", pp. 37–41.

Newbridge Networks, "3604 Main Street", pp. 42–45.

Newbridge Networks, "3612 Main Street", pp. 46–49.

Newbridge Networks, "3624 Main Street", pp. 50–53.

Newbridge Networks, "8230 Main Street", pp. 54–57.

Newbridge Networks, "8231 Main Street", pp. 58–61.

Compression Labs, Inc. (CLI), "Eclipse Videoconferencing System, Model 8100", pp. 62–65.

Compression Labs, Inc. (CLI), "Special Report, Aug. 20, 1993", pp. 66–69.

Compression Labs, Inc. (CLI), "Compare. Why Pay 50–100% More to Get All The Videoconferencing Features You Need?" pp. 70–71.

Compression Labs, Inc. (CLI), "Eclipse in Action", p. 72–73.

Compression Labs, Inc. (CLI), "Rembrandt II—Radiance Videoconferencing System", p. 74–75.

Compression Labs, Inc. (CLI), Letter entitled "Pacific Data Images Uses New Radiance Videoconferencing System to Increase Efficiency of Client Contact", p. 76.

Compression Labs, Inc. (CLI), "Compressing Distances, Expanding Opportunities", pp. 77–88.

PicturesTel Corporation, "PictureTel Live PCS 100 Personal Visual Communications Systems" pp. 89–90.

PicturesTel Corporation, "System 4000 High Performance Dial–Up Video Conferencing", pp. 91–98.

PictureTel Corporation, "System 1000 Affordable Dial–Up Videoconferencing", pp. 99–104.

PictureTel Corporation, "PictureTel: A Chronology", pp. 105–109.

ShareVision, A subsidiary of Creative Technology, Ltd., "ShareView 300", pp. 110–111.

ShareVision, A subsidiary of Creative Technology, Ltd., "ShareView 3000" pp. 112–113.

Smart Technologies, Inc., "Smart 2000 Conferencing System", pp. 114–117.

Smart Technologies, Inc., "Q & A Questions and Answers, Smart 2000 Conferencing System", pp. 118–121.

Smart Technologies, Inc., "Training with Smart 2000" pp. 122–123.*

Smart Technologies, Inc., "Smart Solutions", pp. 124–127.*

* cited by examiner

METHOD AND APPARATUS FOR DISPLAY OF VIDEO IMAGES IN A VIDEO CONFERENCING SYSTEM

CROSS-REFERENCE TO RELATED APPLICATIONS

This is a continuation of application Ser. No. 08/128,017, filed Sep. 28, 1993, now abandoned.

This application is related to:

Application Ser. No. 08/035,092, entitled "Remote Collaboration System," by Carleton et al., filed on Mar. 19, 1993, and assigned to NCR Corporation.

Application Ser. No. 08/035,091, entitled "Remote Collaboration System," by Fitzpatrick et al., filed on Mar. 19, 1993, and assigned to NCR Corporation.

Application Ser. No. 08/033,602, entitled "Remote Collaboration System," by Pommier et al., filed on Mar. 19, 1993, and assigned to NCR Corporation.

Application Ser. No. 08/034,313, entitled "Remote Collaboration System," by Schwartz et al., filed on Mar. 19, 1993, and assigned to NCR Corporation.

Application Ser. No. 08/128,012, entitled "Accelerated Replication of Multiple Computer Displays," by Hester et al., filed on the same date herewith, and assigned to NCR Corporation.

Application Ser. No. 08/128,013, entitled "Annotation of Computer Video Displays," by Carleton et al., filed on the same date herewith, and assigned to NCR Corporation.

Application Ser. No. 08/128,018, entitled "Direct Capture of a Video Conferencing Data," by Alonso-Cedo et al., filed on the same date herewith, and assigned to NCR Corporation.

Application Ser. No. 08/128,018, entitled "Palette Management for Application Sharing in Collaborative Systems," by Hester, filed on the same date herewith, and assigned to NCR Corporation.

Application Ser. No. 08/128,014, entitled "Collaborative Video Conferencing System," by Schwartz et al., filed on the same date herewith, and assigned to NCR Corporation.

The present invention relates to a system in which both graphics and video images are transferred between users of remotely located computers. More, particularly, it relates to the relationship between the graphics and video images and how these images are displayed.

REFERENCE TO A MICROFICHE APPENDIX

A microfiche appendix, containing one (1) microfiche and seventy (70) total frames is filed herewith.

BACKGROUND OF THE INVENTION

The above referenced patent applications, Ser. Nos. 08/035,092, 08/035,091, 08/033,602 and 08/034,313, describe a system in which multiple users are able to remotely operate a single computer program. This system, may be referred to as "collaborative computing." It involves the generation of a graphical image by an application running on one of the computers and the replication of that image on the displays of the other computers. The system also involves the control of the common image including the ability of different users to change and/or annotate the image.

Another feature of this collaborative computing system is the generation of a video image of a user of one of the computers and the transfer and display of that image at remote locations.

The present invention involves the interrelationship of the graphics and video images transferred between computers.

OBJECTS OF THE INVENTION

It is therefore an object of the present invention to provide a new and improved method and apparatus for displaying a video image.

It is another object of the present invention to provide a new and improved electronic conferencing system.

It is a further object of the present invention to provide a method and system for displaying and controlling both graphics and video images on a computer display.

SUMMARY OF THE INVENTION

One form of the present invention is a method of displaying a video image in a computer which has the ability to simultaneously display multiple windows. A graphics image is displayed in a first window, and a video image is displayed in a second window having controls for annotating the graphics image in the first window.

In another form the method includes: displaying control elements in a first window; displaying a video image in a second window; and displaying a graphics image in a third window. When the graphics image is displayed, the video image is automatically transferred from the second window into the first window and the second window is closed.

In yet another form, the present invention is a computer having the ability to simultaneously display multiple windows. The computer comprises: means for displaying a graphics image in a first window; means for providing a second window having controls for annotating the graphics image in the first window; and means for displaying a video image within the second window.

DESCRIPTION OF A PREFERRED EMBODIMENT

The phrase "graphics image" as used herein refers to an image generated by a computer program. It is generally time independent, meaning that any changes that are made in the image can occur at irregular intervals without significantly degrading its performance. For example, graphics images include alphanumeric characters as generated by a word processing application, graphical data as generated by a spread sheet application, drawings as generated by a paint or design program, etc.

The phrase "video image" as used herein refers to a time dependent image generated by a motion picture camera. It is time dependent because the image must be continually updated at regular intervals in order for any motion in the image to be perceived by a viewer as smooth.

The term "window" as used herein means a region (usually rectangular) of a computer display screen which the operating system of the computer grants use of to an application. The window has associated controls which direct the actions of the application. The size and location of the window on the display screen can also be changed by the user of the computer.

A computer having the ability to display multiple windows provides visual access to the application running in each of the windows. Typically, the user of the computer can scale, move and otherwise arrange the windows on the screen.

Figure 1:
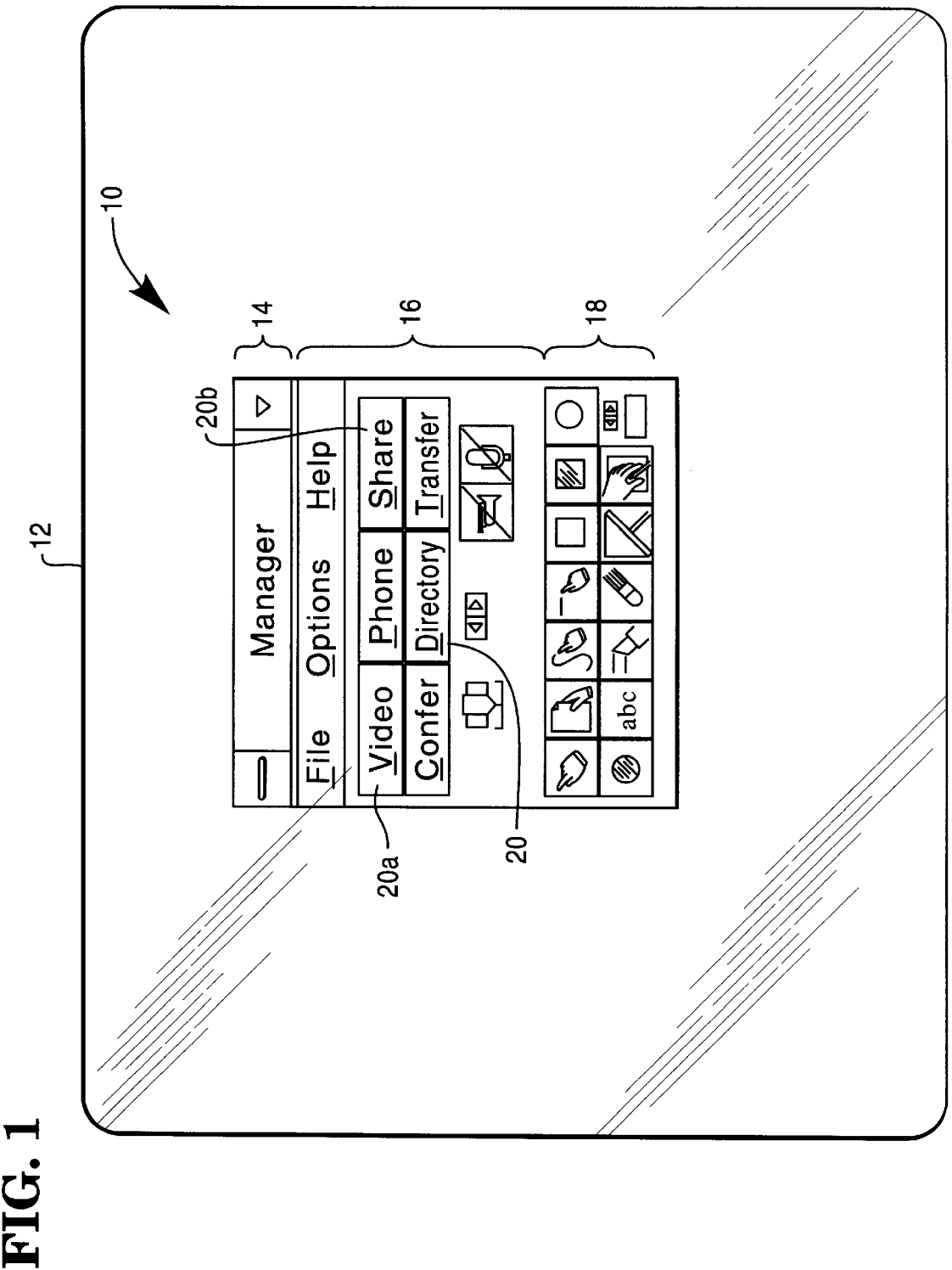
FIG. 1 is a view of a manager window on a computer display screen.

FIG. 1 is a view of a manager window 10 as displayed on a computer display screen 12 associated with a computer. The computer (which is not shown) is equipped with a video camera. The camera may be mounted on an edge surface of the display screen and will be pointed in the direction of the user of the computer.

Manager window 10 controls the main functions associated with a video conferencing system such as described in the patent applications identified in the "Cross-Reference to Related Applications," and which are hereby incorporated by reference. This video conferencing system provides video images of the participants and allows sharing of documents. The communications are provided over telephone lines having ISDN (Integrated Systems Digital Network) capabilities.

Manager window 10 includes a title region 14, a control region 16, and an annotation region 18. Control region 16 includes various control elements (selectively marked as 20a, 20b, . . . ). Control elements 20 may be selected and activated with a pointing device, such as a mouse or through a keyboard. Control elements 20 perform a number of functions related to the establishment and control of a communications link with a remotely located computer. (The remotely located computer will be similarly configured with a video camera.) For example, the control element 20a labeled "Video" allows the user of the computer to make a video call to a remotely located computer. The Video control element 20a has other functions—one of which will be discussed in more detail later.

Another control element 20b, labeled "Share," allows the user of the computer to establish a video conference call with a participant at a remotely located computer. As will be discussed in more detail below, the Share control element 20b allows the user of the computer to share both a video image and a graphics image with a remote participant.

Figure 2:
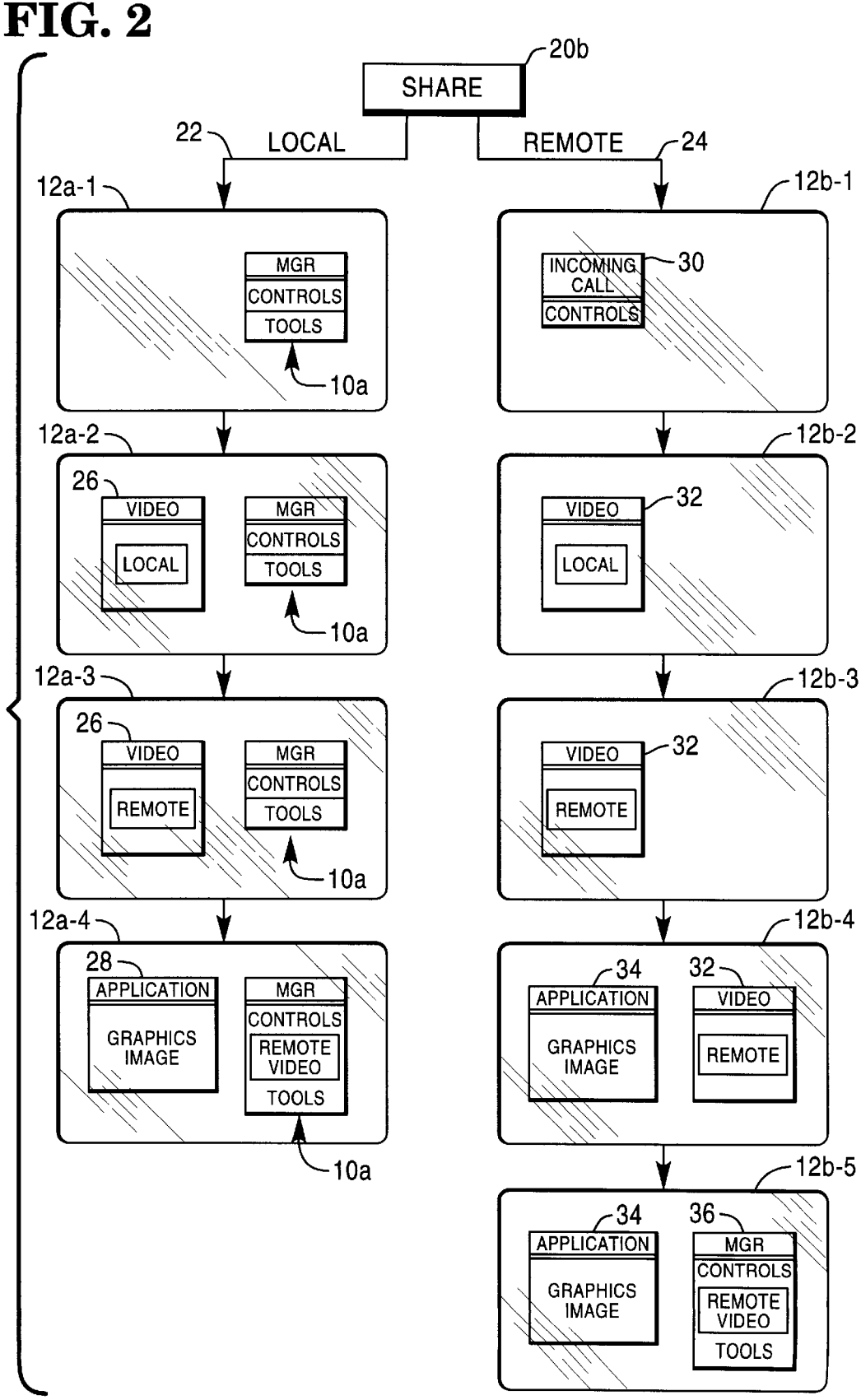
FIG. 2 is a diagram showing changes in views of two different computer display screens according to one embodiment of the present invention.

FIG. 2 is a diagram showing changes in views of two different computer display screens according to one embodiment of the present invention. Starting with the selection of Share control element 20b by the user of the computer, hereinafter referred to as the local computer, the successive views on local computer display screen 12a and remote computer display screen 12b are shown.

The successive views of local computer display screen 12a are shown by local branch 22. In a first view 12a-1 of the computer display screen, "only" the manager window 10a, as described with respect to FIG. 1, is active. As with all of the views of the computer screens described herein, there may be other windows displayed on the screen, as is commonly known in the art. With respect to the subject invention, several windows associated with various parts of a video conferencing system may be generated. These windows will be collectively referred to herein as "video conferencing windows." These video conferencing windows are shown in FIG. 2 and will be described shortly. The statement that "only" manager window 10a is active in first view 12a -1, means that manager window 10a is the only video conferencing window that is active on the screen. However, other non-video conferencing windows may be displayed, at the option of the user of the computer.

Referring again to first view 12a-1, manager window 10a is displayed. As shown in more detail in FIG. 1, manager window 10 has a control element 20b which allows the local user to establish a video conferencing session.

As the session is being established, a video window 26 is generated, and a video image taken by the video camera on the local computer is displayed therein, as shown in the second view 12a-2. The local video image, i.e., the image of the user of the local computer, which is displayed in video window 26 is labeled as "Local."

When the communications link is established, the user of the remote computer (path 24) has the option of accepting or rejecting the call. If the call is accepted or answered and the video camera on the remote computer is active, the video image from the remote computer is transferred to the local computer and displayed in video window 26, as shown in the third view 12a-3. It is expected that the remote video image will be the image of the user of the remote computer. This image automatically replaces the local video image.

The term "automatically" as used herein means without user intervention.

The local user also has the option of sharing a graphics image. In this regard, the phrase "video conferencing" to describe the subject system broadly encompasses both the video images being exchanged between the local and remote computers, as well as the sharing of graphics images generated by a computer program resident on only one of the computers. If the local user starts a program to generate a graphics image to be shared with the remote computer, the associated graphics image of the application is displayed in an application window 28, as shown in fourth view 12a-4. When the graphics image is displayed, the video image is automatically transferred from the video window 26 into the manager window 10a, and the video window 26 closed.

Figure 3:
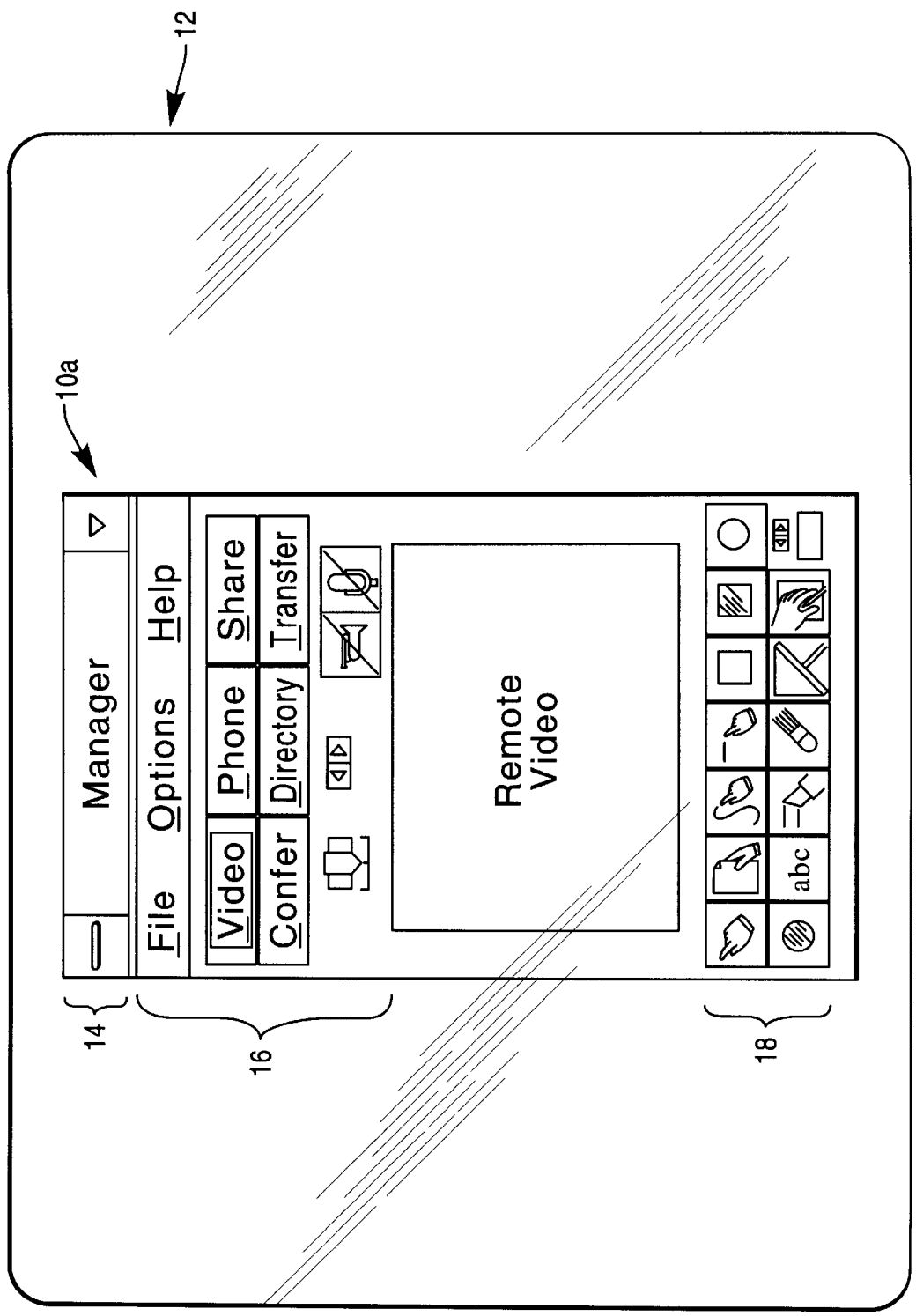
FIG. 3 is a view of the manager window of FIG. 1 with a video image added.

FIG. 3 is a more detailed view of the manager window 10a in FIG. 2. It may be helpful to compare manager window 10a in FIG. 3 with the manager window 10 in FIG. 1. The windows are similar with the exception that manager window 10a is somewhat larger than window 10 in order to accommodate the video image. By displaying the video image within the manager window 10a, the user is provided with a significant advantage in using the video conferencing system. The video image remains visible to the user during a conferencing session. Furthermore, the various controls and annotation tools (to be described later) are also readily available. The user can position the manager window at any location on the screen that is convenient. However, at the same time, the user does not have to contend with positioning the video window—the video image being part of the manager window.

FIG. 2 also shows a series of computer screen views on the remote computer shown by path 24. In a first view 12b-1, a window 30 indicating an incoming call "pops up" on the screen of the remote user. Control elements in window 30 allow the remote user to reject or accept the incoming call.

If the call is accepted, a second view 12b-2 is generated in which a video window 32 is displayed on the screen. Initially, video window 32 displays an image of the user of the remote computer (labeled "local"). The terms "local" and "remote" as used herein to describe the origin of video images are with respect to the user of the specific computer.

In other words, the term "local" when used in the views of path 22 refers to the user of the local computer. In contrast, the term "local" when used in the views of path 24 refers to the user of the remote computer.

After the call is answered, the video image from the camera associated with computer screen 12a is transferred to the remote computer. This video image is then displayed in video window 32, as shown in the third view 12b-3. This image automatically replaces the video image shown in view 12b-2.

When the local user starts a program, as discussed above, to generate a graphics image to be shared with the remote computer, the associated graphics image of the application is transferred to the remote computer. The graphics image is then displayed in an application window 34, as shown in fourth view 12b-4. Because the remote user has not opened a manager window, both the video and application window are displayed. (The manager window for the remote computer must be active—however, it is not necessary that it be displayed.)

In order to participate in a video conferencing session, both the remote and local computers must run video conferencing software. Such software includes the manager window and functions, described above. Thus, the remote user has the option of opening a manager window 36 in the remote computer, as shown in the fifth view 12b-5. When manager window 36 is opened, the video image is automatically transferred from the video window 34 into the manager window 36, and the video window 32 closed.

Figure 4:
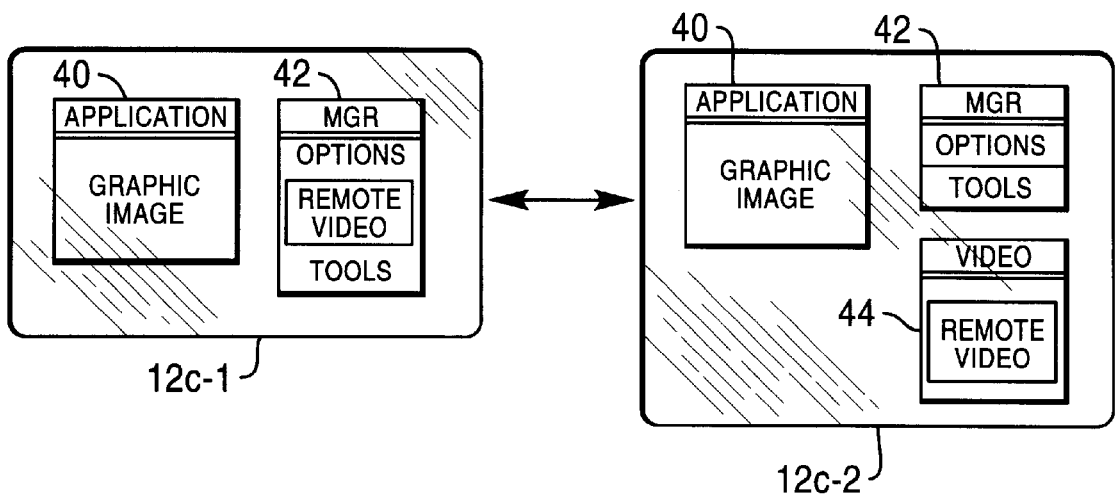
FIG. 4 is a diagram showing different views of a computer display screen according to another form of the present invention.

Another feature of the present invention is shown in FIG. 4 in the two different views 12c-1 and 12c-2 of a computer screen. View 12c-1 is similar to that shown in views 12a-4 and 12b-5 in FIG. 2. Namely, two windows—an application window 40 with a graphics image, and a manager window 42 including a video image are displayed. View 12c-2 shows three windows—application window 40, manager window 42 and a video window 44. In view 12c-2, the video image has been moved from the manager window 42 into its own video window. This move occurs in response to a command from the user of the computer. In practice, this transfer can be completed either by activating a control (such as Video control element 20a) in manager window 42 or by establishing a fast transfer command, such as using a mouse to point at the video image and double clicking. Similarly, the video image in view 12c-2 can be moved back into the manager window 42 by a predetermined control in either the video or manager window.

Another feature of the video conferencing system can be seen by referring back to FIG. 1. More particularly, reference is made to annotation region 18. Region 18 includes a number of controls or tools for annotating a graphics image, such as shown in application windows 28 or 34 in FIG. 2, or for annotating a video image, such as shown in video windows 26 or 32 in FIG. 2. Some of the tools provide the capability of generating straight, curved or freehand lines and text; the ability to selectively or universally erasing the annotations; and a palette for changing the colors of the annotations. Each of these tools has the ability to change the appearance of the image in another window.

The term "annotating" when used herein with respect to a graphics or video image means to add a second image over the graphics or video image. In the case of a graphics image, the second image is generated by a different program than generates the graphics image. For example, underlining and overstriking which may be available within a word processing program are not considered "annotating" within this definition. However, underlining, highlighting, commenting, etc., are annotations if they are provided by a separate program. Such annotations are displayed by logically combining the annotations with the graphics images in the video display memory.

Computer code in microfiche form is attached. A description of files contained therein is contained in the following Table. This Table describes a specific embodiment of the invention which uses the following terms and phrases:

"TeleGraphics" is a trade name used to describe the overall collaborative video conferencing system described in the subject case and those cross-referenced herein. "TeleMedia Manager" is a trade name used to describe a specific implementation of manager window 10.

"Annotation toolbar" refers to annotation region 18.

TABLE

| | |
|---|---|
| anntb.c | Functions to display the annotation toolbar (the bottom half of the TeleMedia Manager screen) |
| anntb.h | Data structures and prototypes needed to display the annotation toolbar |
| annvid.c | Functions to display video when it is inserted in the annotation t6olbar |
| annvid.h | Data structures and prototypes needed by annvid.c |
| televid.c | Functions to display the portion of the annotation toolbar that appears under the video portion of the toolbar |
| televid.h | Data structures (named identifiers) and function prototypes needed by televid.c |
| tmscreen.c | Functions to support the TeleMedia Manager screen and controls (e.g. the buttons). The functions handle the buttons, the changing of the button states, etc. |
| umb.c | Functions to display the main portion of the TeleMedia Manager screen<br>Contains the main program for the TeleMedia Connection and its window procedure |
| umb.h | Named identifiers and function prototypes needed by umb.c |
| vidwin.c | Functions to interface with the video device driver |
| vidwin.h | Prototypes and data structures needed to interface with the video device driver |

It will be clear to those skilled in the art that the present invention is not limited to the specific embodiment disclosed and illustrated herein. Numerous modifications, variations, and full and partial equivalents can be undertaken without departing from the invention as limited only by the spirit and scope of the appended claims.

What is desired to be secured by Letters Patent is as follows.

What is claimed is:

1. In a user operated computer having a screen and the ability to communicate with a remotely located computer, a method of displaying a video image comprising the steps:

a) creating a first type of window on said screen, said first type of window having an image region and a control region, said control region being used for providing control elements for (1) establishing a communication link with said remotely located computer during a first time period, and (2) controlling a communication link with said remotely located computer during a second time period which is different from said first time period;

b) creating a second type of window on said screen;

c) creating a third type of window on said screen;

d) displaying the video image in said second type of window;

e) displaying a graphics image in said third type of window;

f) when said graphics image is displayed in said third type of window, automatically transferring said video image from said second type of window into said image region in said first type of window so that said video image is displayed during said second time period and closing said second type of window; and g) said user activating a control element in said first type of window to recreate said second type of window and move said video image from said first type of window to said second type of window.

2. In a system in which each of two or more computers has a respective screen and the ability to display multiple windows on said respective screen, and in which each of said computers has a single window in which a common application is shared, a method of displaying multiple windows in a first of said computers, comprising the steps:

a) creating said shared window on the screen of said first of said computers for displaying a video image received from a second of said computers;

b) creating a manager window on the screen of said first of said computers, said manager window containing a control region having tools for changing the appearance of the application in the shared window and an image region for displaying an image;

c) transferring said video image received from said second of said computers into said image region in said manager window; and d) transferring the video image from said manager window back to a third type of window in response to a command from a user of said first computer.

* * * * *